(12) United States Patent
Lo

(10) Patent No.: US 11,557,318 B1
(45) Date of Patent: Jan. 17, 2023

(54) HEAD GIMBAL ASSEMBLY, MANUFACTURING METHOD THEREOF, AND DISK DRIVE UNIT

(71) Applicant: SAE Magnetics (H.K.) Ltd., Hong Kong (CN)

(72) Inventor: Chi Wai Lo, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 17/706,926

(22) Filed: Mar. 29, 2022

(51) Int. Cl.
*G11B 5/48* (2006.01)

(52) U.S. Cl.
CPC .................................. *G11B 5/4826* (2013.01)

(58) Field of Classification Search
None
See application file for complete search history.

(56) References Cited

U.S. PATENT DOCUMENTS

| | | | | |
|---|---|---|---|---|
| 4,964,941 A * | 10/1990 | Von Brandt | ............ | G11B 21/16 29/603.04 |
| 5,021,907 A * | 6/1991 | Zak | ....................... | G11B 5/4853 360/234.6 |
| 5,215,608 A * | 6/1993 | Stroud | ............... | H05K 13/0465 360/234.6 |
| 5,617,274 A * | 4/1997 | Ruiz | ....................... | G11B 5/484 360/245.5 |
| 5,652,684 A * | 7/1997 | Harrison | .............. | G11B 5/4826 360/245.1 |
| 5,680,275 A * | 10/1997 | Frater | .................. | G11B 5/4826 360/234.5 |
| 5,875,071 A * | 2/1999 | Erpelding | .............. | G11B 5/486 |
| 5,880,908 A * | 3/1999 | Shiraishi | ............. | G11B 5/4826 360/234.6 |
| 6,078,472 A * | 6/2000 | Mitoh | .................. | G11B 5/4853 |
| 6,604,431 B1 * | 8/2003 | Soga | ................... | H01L 41/1132 73/777 |
| 6,771,466 B2 * | 8/2004 | Kasajima | ............. | G11B 5/4826 360/234.6 |
| 7,006,331 B1 * | 2/2006 | Subrahmanyam | ... | G11B 5/4826 360/234.6 |
| 7,057,857 B1 * | 6/2006 | Niu | ....................... | G11B 5/4826 |
| 7,729,089 B1 * | 6/2010 | Hogan | ................. | G11B 5/4826 360/234.6 |
| 7,952,833 B2 * | 5/2011 | Smith | .................. | G11B 5/4826 360/234.5 |

(Continued)

*Primary Examiner* — Brian E Miller
(74) *Attorney, Agent, or Firm* — Nixon & Vanderhye, P.C.

(57) ABSTRACT

An HGA includes a slider and a suspension for supporting the slider, wherein the suspension includes a flexure having a plurality of electrical traces formed thereon and a gimbal connection area supported and connected to the slider, a first surface of the gimbal connection area is provided with a first adhesive and a second adhesive respectively formed thereon and between the first surface and an opposite surface of an air bearing surface of the slider, an opposite surface of the first surface of the gimbal connection area is contacted with a dimple, and the dimple is located at a position between first adhesive and the second adhesive. The HGA can eliminate torsion and sway gain in frequency response function testing, and maintain AC stroke sensitivity and linearity of elements, thereby finally improving the performance of the disk drive unit.

19 Claims, 12 Drawing Sheets

(56) References Cited

U.S. PATENT DOCUMENTS

| | | | | |
|---|---|---|---|---|
| 8,295,012 B1* | 10/2012 | Tian | ................... | G11B 5/483 |
| | | | | 360/245.4 |
| 8,693,144 B1* | 4/2014 | Pan | ................... | G11B 5/4826 |
| | | | | 360/245.2 |
| 8,711,521 B2 | 4/2014 | Feng et al. | | |
| 8,947,831 B1 | 2/2015 | Ee et al. | | |
| 9,117,446 B2 | 8/2015 | Bao et al. | | |
| 9,558,768 B1 | 1/2017 | Tsuchiya et al. | | |
| 9,613,644 B2* | 4/2017 | Miller | ................... | G11B 5/4873 |
| 10,720,179 B1 | 7/2020 | Sedklang et al. | | |
| 10,748,564 B2* | 8/2020 | Ee | ................... | G11B 5/4833 |
| 10,957,351 B2* | 3/2021 | Nesori | ................... | H01L 41/0472 |
| 2004/0075946 A1* | 4/2004 | Motonishi | ................... | G11B 5/4826 |
| | | | | 360/234.6 |
| 2005/0099733 A1* | 5/2005 | Hagen | ................... | G11B 5/486 |
| | | | | 360/245.7 |
| 2005/0141138 A1* | 6/2005 | Shiraishi | ................... | G11B 5/486 |
| | | | | 360/245.9 |
| 2006/0082917 A1* | 4/2006 | Yao | ................... | G11B 5/5552 |
| 2007/0109690 A1* | 5/2007 | Yao | ................... | G11B 5/4873 |
| 2008/0037174 A1* | 2/2008 | Yao | ................... | G11B 5/4826 |
| 2009/0244786 A1* | 10/2009 | Hatch | ................... | G11B 5/483 |
| | | | | 360/294.4 |
| 2019/0392869 A1* | 12/2019 | Call | ................... | G11B 5/455 |
| 2022/0157337 A1* | 5/2022 | Aoki | ................... | G11B 5/4826 |

\* cited by examiner

HEAD GIMBAL ASSEMBLY, MANUFACTURING METHOD THEREOF, AND DISK DRIVE UNIT

FIELD OF THE INVENTION

The present invention relates to information recording disk drive devices and, more particularly, to a head gimbal assembly (HGA), a disk drive unit with the same and a manufacturing method of such an HGA.

BACKGROUND OF THE INVENTION

Hard disk drives are common information storage devices. FIG. 1a provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and HGA 150. Typically, a spindling voice-coil motor (VCM) is provided for controlling the motion of the drive arm 104.

Referring to FIG. 1B, the HGA 150 includes a slider 103 having a reading/writing transducer (not shown) imbedded therein, a suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

FIG. 1c shows a conventional suspension, the suspension 190 includes a load beam 106, a base plate 108, a hinge 107 and a flexure 105, all of which are assembled together.

The load beam 106 is connected to the base plate 108 by the hinge 107. A locating hole 112 is formed on the load beam 106 for aligning the load beam 106 with the flexure 105. And the load beam 106 is welded with the flexure for increasing the strength of the entire structure.

The base plate 108 is used to enhance structure stiffness of the whole HGA 150. A mounting hole 113 is formed on one end of the base plate 108 for mounting the whole HGA 150 to the motor arm 104 (referring to FIG. 1a). Another hole 110 is formed on the other end of the base plate 108, which is aligned with a hole 110' formed on the hinge 107 and a hole 110" formed on the flexure 105. The hinge 107 has a mounting hole 113' formed on its one end corresponding to the mounting hole 113 of the base plate 108, and the hinge 107 is partially mounted to the base plate 108 with the mounting holes 113', 113 aligned with each other. The hinge 107 and the base plate 108 may be mounted together by laser welding at pinpoints 109 distributed on the hinge 107. Two hinge steps 115 are integrally formed at two sides of the hinge 107 at one end adjacent the mounting hole 113' for connecting with the flexure 105.

The flexure 105 runs from the hinge 107 to the load beam 106. The flexure 105 has a proximal end 119 adjacent the hinge 107 and a distal end 118 adjacent the load beam 106. A locating hole 112' is formed on the distal end 118 of the flexure 105 and aligned with the locating hole 112 of the load beam 106, thus obtaining a high assembly precision. A gimbal tongue 116 is provided at the distal end of the flexure 105 to carry the slider 103 thereon.

As illustrated in FIG. 1d, the flexure 105 has a leading portion 121 adjacent the gimbal tongue 116, and a tailing portion 122 opposite to the leading portion 121. A plurality of electrical traces 120 is formed on the flexure 105 along length direction thereof. More specifically, the electrical traces 120 begin with the leading portion 121 and terminate at the tailing portion 122. The gimbal tongue 116 has a plurality of bonding pads 117 formed thereon for coupling the slider 103. One end of the electrical traces 120 connects to the bonding pads 117, and the other end thereof is electrically connected to a preamplifier (not shown). When the slider 103 is mounted on the gimbal tongue 116, the trailing edge 103a of the slider 103 is welded and electrically coupled with one end of the traces 120, while the leading edge 103b of the slider 103 is rest on the gimbal tongue like a free end. Two PZT actuators 131 are configured at both sides of the slider 103 and electrically connected to the traces 120 for actuating the slider 103. The PZT actuators 131 are made of piezoelectric elements that can be expanded or contracted under an applied voltage for carrying out a tiny position control for the slider.

However, such a slider and HGA still have weakened performance during frequency response function testing, the gimbal region of the HGA show significant torsion and gain in certain frequency (as shown in FIG. 8) which is out of design control specification, might cause the wrong tracking of slider on the disk, and even might cause collision between slider and disk during working status.

Thus, there is a need for an improved HGA that does not suffer from the above-mentioned drawbacks.

SUMMARY OF THE INVENTION

One aspect of the present invention is to provide an improved HGA, which eliminates or reduces torsion and sway gain in frequency response function testing, and maintains alternating current stroke sensitivity and linearity of elements, thereby improving the performance of the slider.

Another aspect of the present invention is to provide a disk drive unit with an improved HGA, which eliminates or reduces torsion and sway gain in frequency response function testing, and maintains alternating current stroke sensitivity and linearity of elements, thereby finally improving the performance of the disk drive unit.

Yet another aspect of the present invention is to provide a manufacturing method of an HGA, which eliminates or reduces torsion and sway gain in frequency response function testing, and maintains alternating current stroke sensitivity and linearity of elements, thereby finally improving the performance of the disk drive unit.

To achieve above objectives, an HGA includes a slider and a suspension for supporting the slider, wherein the suspension includes a flexure having a plurality of electrical traces formed thereon and a gimbal connection area supported and connected to the slider, a first surface of the gimbal connection area is provided with a first adhesive and a second adhesive respectively formed thereon and between the first surface and an opposite surface of an air bearing surface of the slider, an opposite surface of the first surface of the gimbal connection area is contacted with a dimple, and the dimple is located at a position between first adhesive and the second adhesive.

As an embodiment of the present invention, the dimple is located at a position corresponding to a center of the slider, the first adhesive is located between the dimple and a trailing edge of the slider, and the second adhesive is located between the dimple and a leading edge of the slider.

Preferably, the first adhesive, the dimple and the second adhesive are aligned on a centerline of the gimbal connection area.

As an embodiment of the present invention, the first adhesive is formed on a stainless steel surface of the gimbal connection area; a portion of the electrical traces is extended on the first surface of the gimbal connection area, and the second adhesive is formed on a cover layer of the electrical traces.

As an embodiment of the present invention, a size of the first adhesive is 1.5-3 times that of the second adhesive.

Preferably, the first adhesive has a diameter of 200-300 um, and a thickness of 20-30 um; the second adhesive has a diameter of 100-200 um, and a thickness of 3-8 um.

More preferably, the first adhesive and the second adhesive are anaerobic adhesive, and have viscosity of 30-70 kPa*s.

As an embodiment of the present invention, the suspension further includes piezoelectric elements arranged on both sides of the slider in a width direction and connected to the electrical traces.

Preferably, the second adhesive is located at a rotation center of the slider rotated under action of the piezoelectric elements.

Optionally, the slider is a Pemto, Femto, MAMR or HAMR slider.

Preferably, a first surface of the gimbal connection area is parallel to the opposite surface of the air bearing surface of the slider.

Preferably, the opposite surface of the air bearing surface of the slider is inclined relative to a horizontal plane.

A disk drive unit includes the head gimbal assembly mentioned above; a drive arm connected to the head gimbal assembly; a disk; and a spindle motor operable to spin the disk.

A manufacturing method of a head gimbal assembly includes:
providing a slider and a suspension having a flexure;
defining a first adhesion position, a second adhesion position and a dimple position on a gimbal connection area on the flexure for supporting and connecting the slider;
dispensing a first adhesive and a second adhesive on the first adhesion position and the second adhesion position, respectively, wherein a dimple on the dimple position is located between the first adhesive and the second adhesive; and
bonding the slider with the gimbal connection area.

In comparison with the prior art, due to the arrangement of the first and the second adhesive in the present invention, the cured adhesives can enable enough adhesion force to prevent the magnetic head from dropping when experienced mechanical shocks, furthermore, a certain constraint is created near the leading edge of the slier due to the second adhesive, which reduces the sway gain generated by the slider during FRF testing at a certain modulation frequency such as at 26 kHz, thereby improving the performance of the slider. Furthermore, the second adhesive is sized and configured to maintain the AC stroke sensitivity and linearity characteristic of the PZT elements, that is, no significant PZT stroke sensitivity loss will be created.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1A:
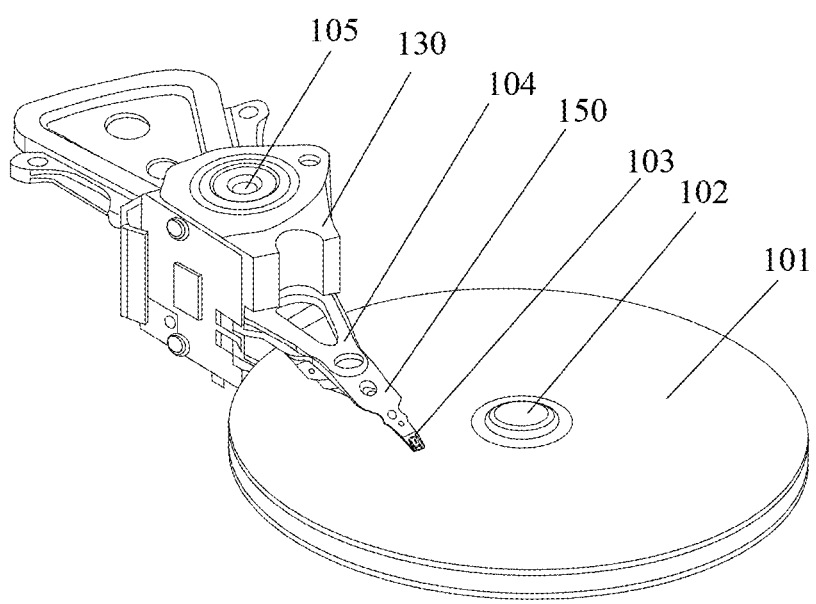
FIG. 1a is a perspective view of a conventional disk drive unit.
Figure 1B:
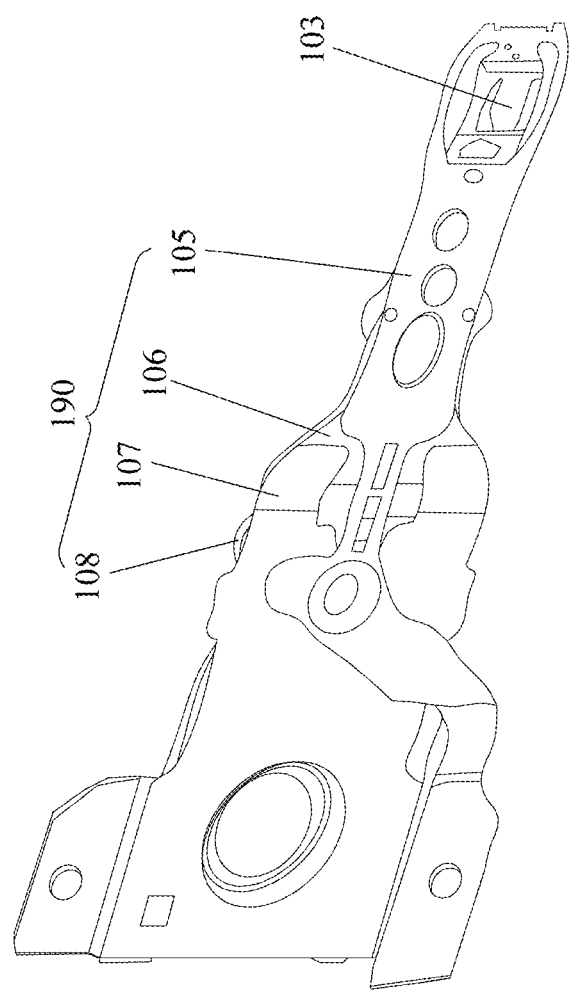
FIG. 1B is a perspective view of a conventional HGA.
Figure 1C:
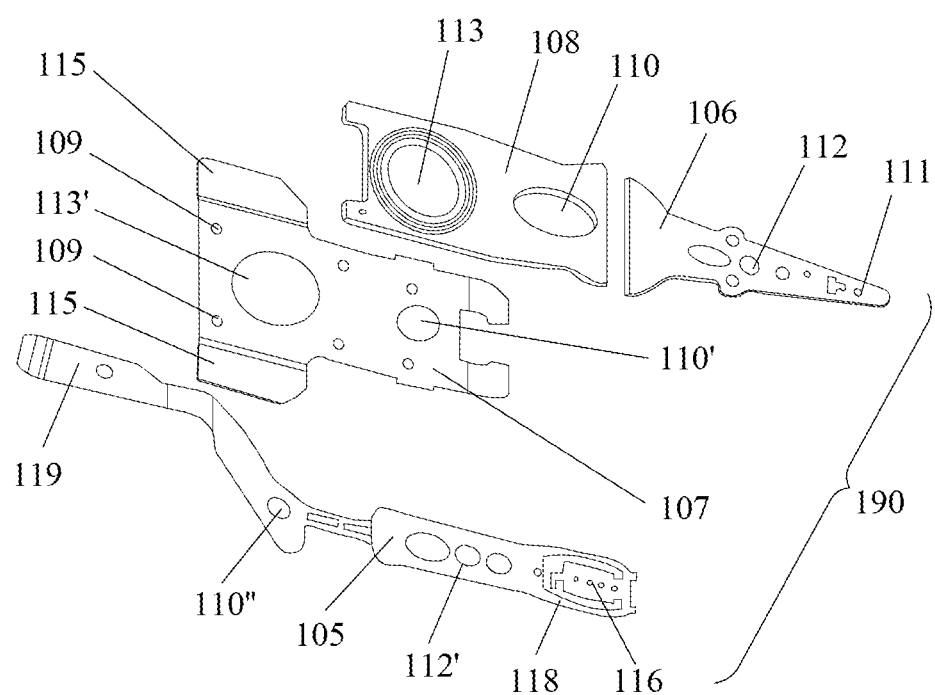
FIG. 1c is an exploded perspective view of the HGA shown in FIG. 1b.
Figure 1D:
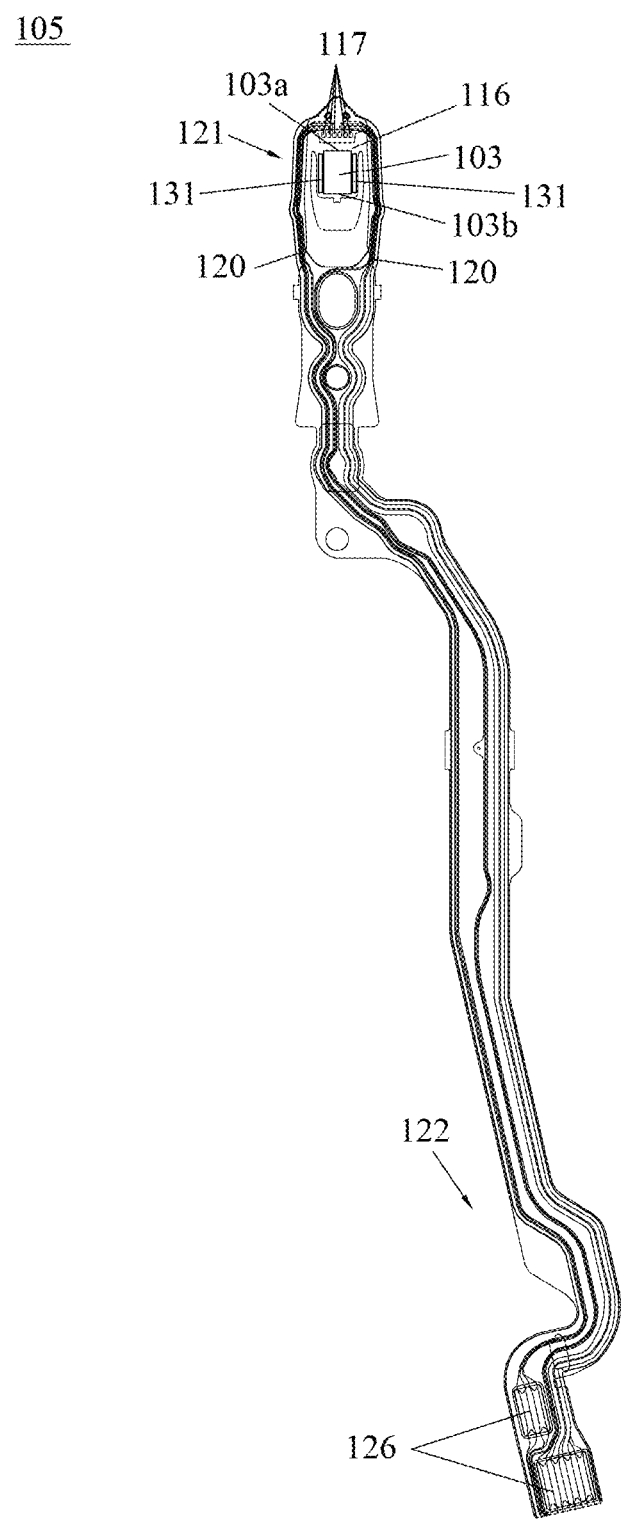
FIG. 1d is a top plan view of a flexure of the suspension with a slider formed thereon.

Various preferred embodiments of the invention will now be described with reference to the figures, wherein like reference numerals designate similar parts throughout the various views. As indicated above, the invention is directed to an HGA of a disk drive unit, which eliminates or reduces torsion and sway gain in frequency response function testing, and maintains alternating current stroke sensitivity and linearity of the PZT elements, thereby improving the performance of the slider and the disk drive device.

Figure 2:
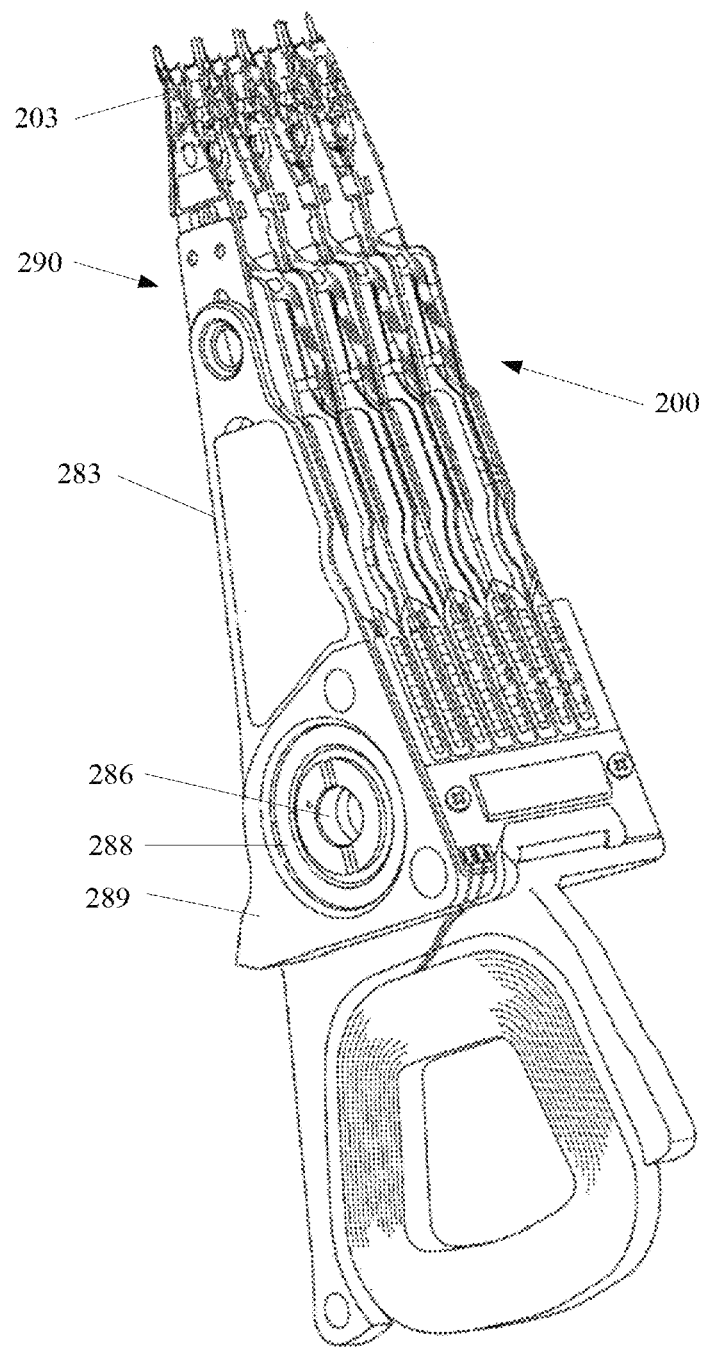
FIG. 2 is a perspective view of HGAs according to an embodiment of the present invention.

FIG. 2 is a perspective view of HGAs according to an embodiment of the present invention. In this embodiment, several HGAs 200 are assembled together. As illustrated, the HGAs 200 include an actuator block 289 with a through hole 286, a bearing unit 288 provided in the through hole 286, a plurality of arms 283 extending from the actuator block 289, suspensions 290 attached to the corresponding arms 283, and sliders 203 with magnetic heads supported by the respective suspension 290.

Figure 3:
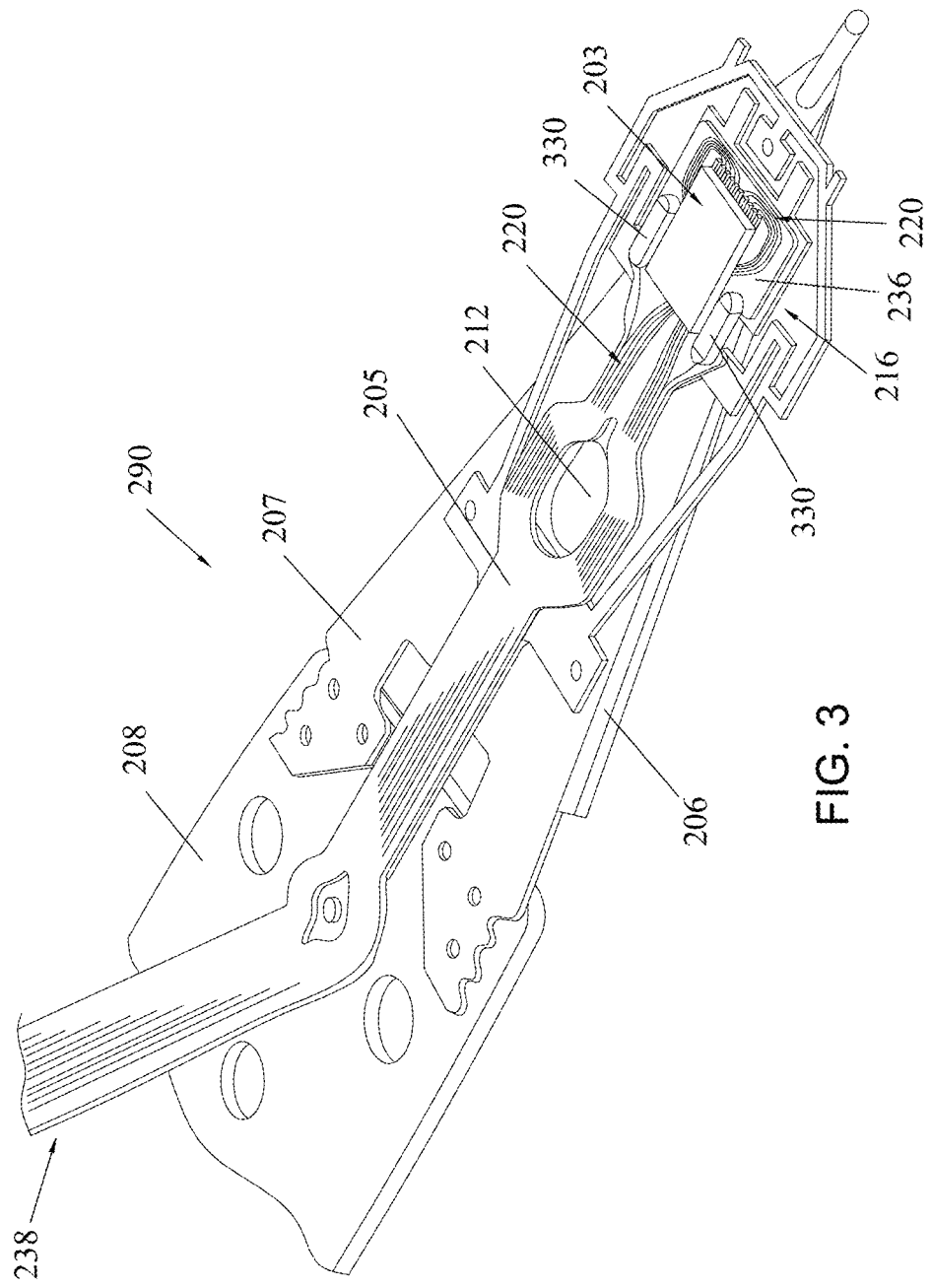
FIG. 3 is a partial view of an HGA according to an embodiment of the present invention.

As illustrated in FIG. 3, a partial HGA 200 includes a slider 203 and a suspension 290 for supporting the slider 203. The slider 203 in the present invention is applicable to a Pemto, Femto, MAMR or HAMR slider, which is not limited. Especially, the Pemto or Femto slider may have a thickness of 0.16 mm for example.

Figure 4:
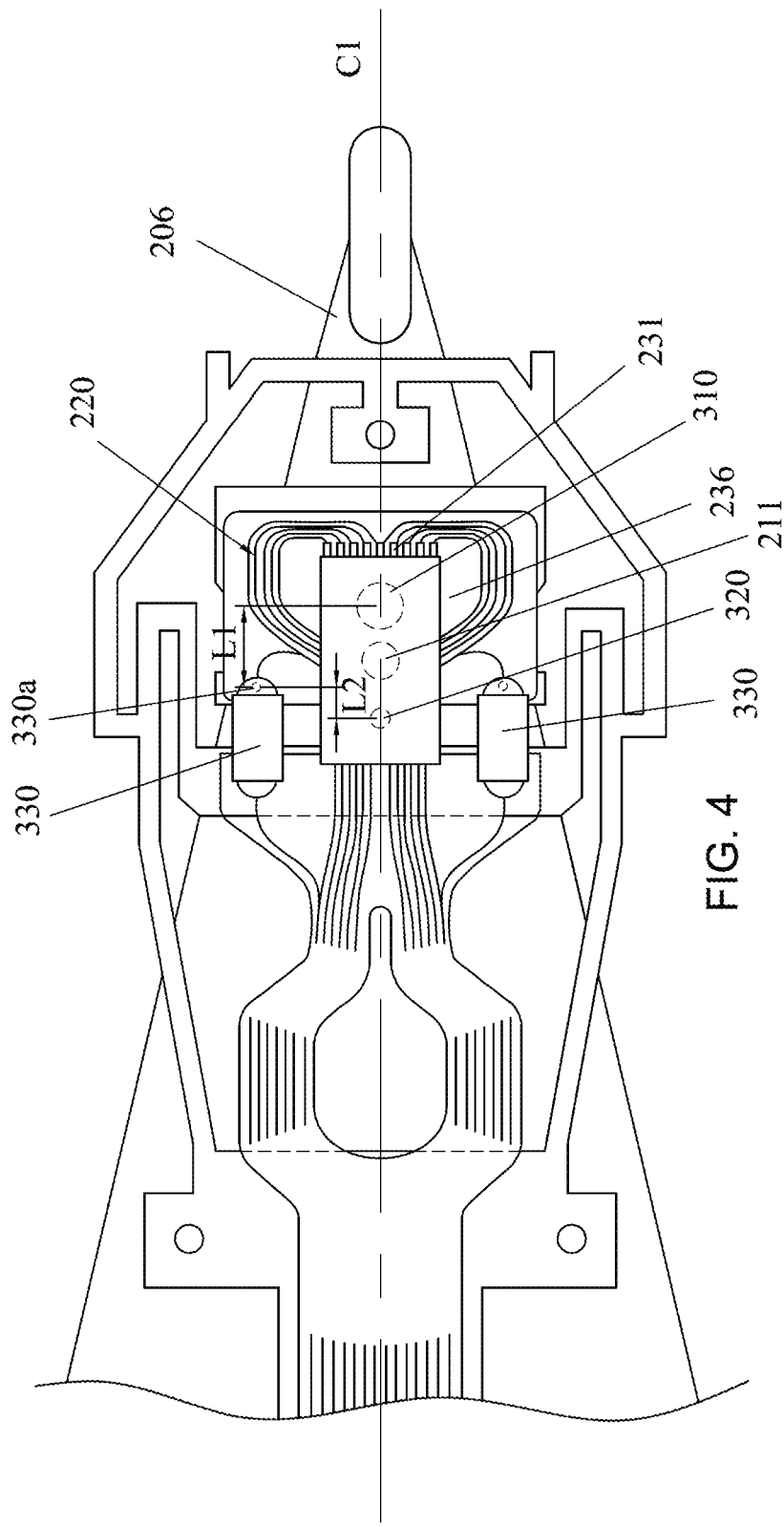
FIG. 4 is a top plan view of the HGA shown in FIG. 3.

Specifically, as shown in FIGS. 3-4, the suspension 290 including a load beam 206, a base plate 208, a hinge 207 and a flexure 205, all of which are assembled with each other. The load beam 206 is used to transfer load forces to the flexure 205 and the slider 203 mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 212 is formed on the load beam 206 for aligning itself with the flexure 205. A dimple 211 (shown in FIG. 4) is formed on the load beam 206 to support the flexure 205 at a position corresponding to a center of the slider 203.

By this engagement of the dimple 211 with the flexure 205, the load forces can be transferred to the slider uniformly. The base plate 208 is used to enhance structure stiffness of the whole suspension 290 and may be made of rigid material such as stainless steel. The hinge 207 and the base plate 208 may be mounted together by laser welding.

The flexure 205 is made of flexible material and runs from the hinge 207 to the load beam 206. A gimbal connection area for supporting the slider 203 includes a gimbal tongue 236 is provided at a top portion 216 of the flexure 205 to support the slider 203 thereon. The tail portion 238 of the flexure 205 is adapted for establishing electrical connection with a flexible printed cable (not shown), thus connecting with a control servo. The flexure 205 has a plurality of electrical traces 220 which run from the top portion 216 to the tail portion 238 formed thereon and are configured to transmit a recording/reading signal and a drive signal for a pair of piezoelectric (PZT) elements 330 mounted on the flexure 205.

The pair of piezoelectric elements 330 uses, for example, a piezoelectric thin film of rectangular plate shape. The PZT element 330 is not limited to the piezoelectric thin film, but a bulk piezoelectric element or bulk laminated piezoelectric element may be used. The PZT elements 330 are each arranged such that a longitudinal direction (extending and contracting direction) thereof is parallel to the central axis C1 of the load beam 206. The two PZT elements 330 are arranged on both sides of the slider 203 in a width direction and are arranged side by side in a parallel with each other. Each of the PZT elements 330 has longitudinal ends electrically connected to the traces at the gimbal tongue 236 and a bridge portion near the gimbal tongue 236. More specifically, the length of PZT elements 330 is sized and configured to make the rotation center of the slider 203 at a position (that is the second adhesive 320 as will be described below) between the dimple 211 and a leading edge 203d of the slider 203.

Figure 5:
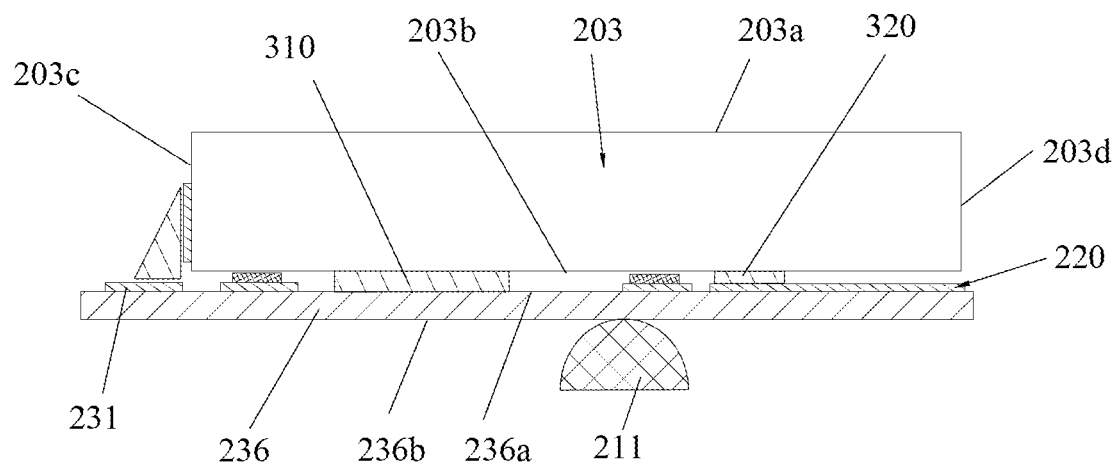
FIG. 5 is a side view of a partial HGA according to an embodiment of the present invention.

Referring to FIGS. 3-5, the gimbal tongue 236 at the top portion 216 of the flexure 205 includes a first surface 236a for supporting the slider 203, and a second surface 236b opposite to the first surface 236a for supporting the dimple 211 thereby connecting to the load beam under the flexure 205. Specifically, the slider 203 has an air bearing surface 203a, an opposite surface 203b of an air bearing surface 203a, a trailing edge 203c for connecting and welding with the end of the electrical traces 220 and a leading edge 203d that is suspended.

As the conception of the present invention, the first surface 236a of the gimbal tongue is provided with a first adhesion position and a second adhesion position to allow a first adhesive 310 and a second adhesive 320 respectively to be formed thereon and between the first surface 236a and the opposite surface 203b of the air bearing surface 203a of the slider 203. That is, the first adhesive 310 and the second adhesive 320 are formed between the slider and the first surface 236a for stabilizing the slider 203. The second surface 236b opposite to the first surface 236a of the gimbal tongue 236 is provided with a dimple position to allow the dimple 211 to be contacted, that is, the dimple 211 is formed on the load beam 206 and contacted to the second surface 236b of the gimbal tongue 236 to support the flexure 205. More specifically, the dimple 211 is located at a position corresponding to a center of the slider 203.

In the present invention, the dimple 211 is located at a position between first adhesive 310 and the second adhesive 320. The first adhesive 310 is located between the dimple 211 and the trailing edge 203c of the slider 203, and the second adhesive 320 is located between the dimple 211 and the leading edge 203d of the slider 203. In such an arrangement of the first and the second adhesive, the cured adhesives can enable enough adhesion force to prevent the magnetic head from dropping when experienced mechanical shocks, furthermore, a certain constraint is created near the leading edge 203d of the slier 203 due to the second adhesive 320, which reduces the sway gain generated by the slider during FRF testing at a certain modulation frequency such as at 26 kHz, thereby improving the performance of the slider.

As a preferable embodiment, the first adhesive 310, the dimple 211 and the second adhesive 320 are aligned on a centerline C1 of the gimbal connection area (namely the centerline of the suspension), as illustrated in FIG. 4.

Specifically, the first adhesive 310 is formed on the surface of the gimbal tongue 236 directly, for example is formed on a surface of the stainless steel. In this embodiment, one end of the electrical traces 220 is started from the bonding pads 231 at the flexure 205 corresponding to the leading edge 203d of the slider 203, and extended along the length of the flexure, specifically extended at both sides of the gimbal tongue 236, and the second adhesive 320 is formed on a cover layer of the electrical traces 220 on the gimbal connection area. Specifically, the second adhesive 320 is formed on the cover layer of the electrical traces 220, such as a polymide surface.

In a preferred embodiment, a size of the first adhesive 310 is 1.5-3 times that of the second adhesive 320, for example, the first adhesive 310 has a diameter of 200-300 um, and a thickness of 20-30 um; the second adhesive 320 has a diameter of 100-200 um, and a thickness of 3-8 um. Both of the first adhesive 310 and the second adhesive 320 are anaerobic adhesive, and have viscosity of 30-70 kPa*s, for example 40-50 kPa*s preferably. The first adhesive 310 and the second adhesive 320 may have a round or cylindrical shape.

The size controls for the first and the second adhesives 310, 320 are critical in balancing sway gain of the HGA during the frequency response function testing and stroke loss of the PZT elements. Since the second adhesive 320 is small enough to maintain the AC stroke sensitivity and linearity characteristic of the PZT elements, that is, no significant PZT stroke sensitivity loss will be created.

Preferably, the locations of the first adhesive 310 and the second adhesive 320 distancing from the copper hole of the PZT elements 330 are optimized for obtaining a further improvement in the PZT stroke sensitivity loss. Specifically, the vertical distance L1 between the center of the copper hole 330a of the PZT element 330 and the center of the first adhesive 310 is about 370-450 um, while the vertical distance L2 between the center of the copper hole 330a of the PZT element 330 and the center of the second adhesive 310 is about 90-170 um, in the centerline C1 direction.

Figure 8:
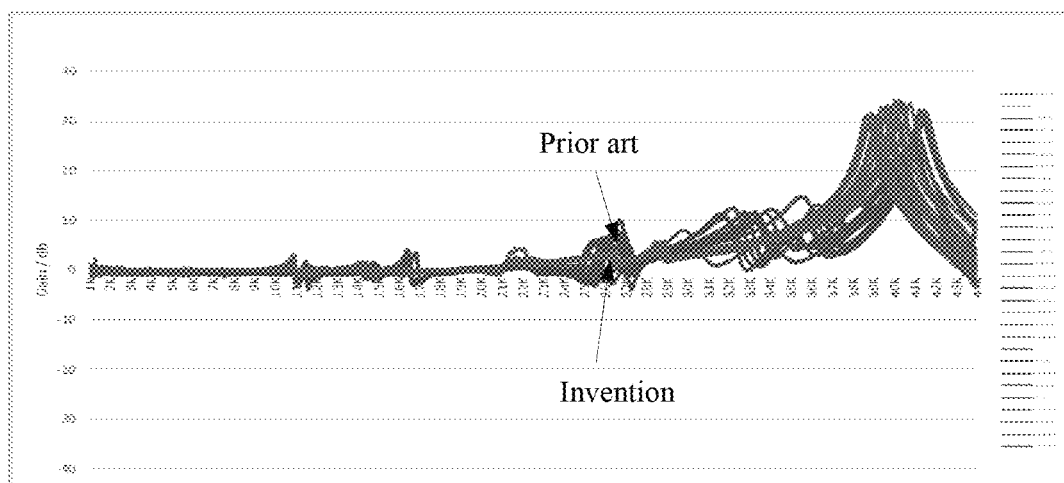
FIG. 8 is a schematic diagram showing the sway gain of the conventional HGA and the HGA in the present invention during the frequency response function testing.

FIG. 8 is a schematic diagram showing the sway gain of the conventional HGA 150 and the HGA 200 in the present invention during the frequency response function testing. It can be seen that, the sway gain of the HGA 200 at certain modulation frequencies (such as 25-36 kHz, especially 26 kHz) is significantly reduced in the present invention, by comparison with the conventional one.

Figure 6:
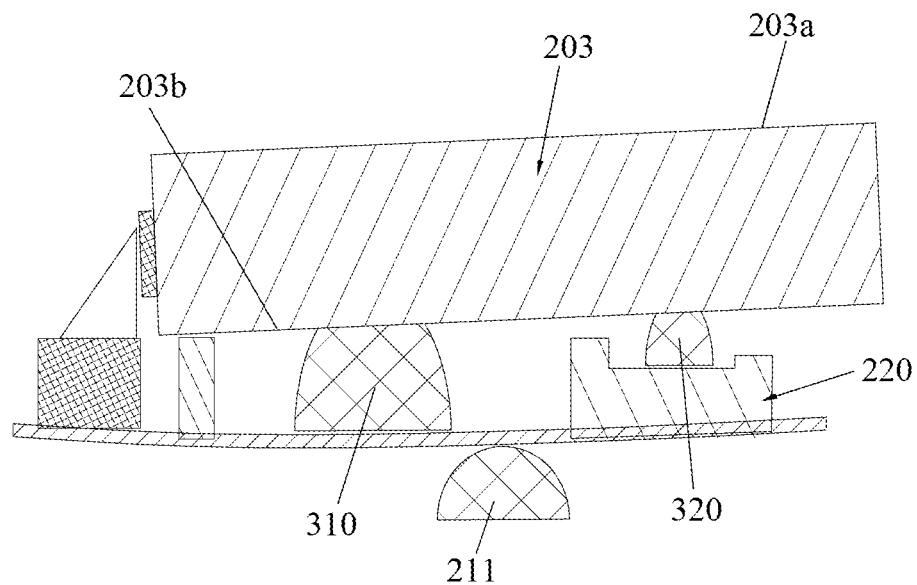
FIG. 6 is a side view of a partial HGA according to another embodiment of the present invention.
Figure 7:
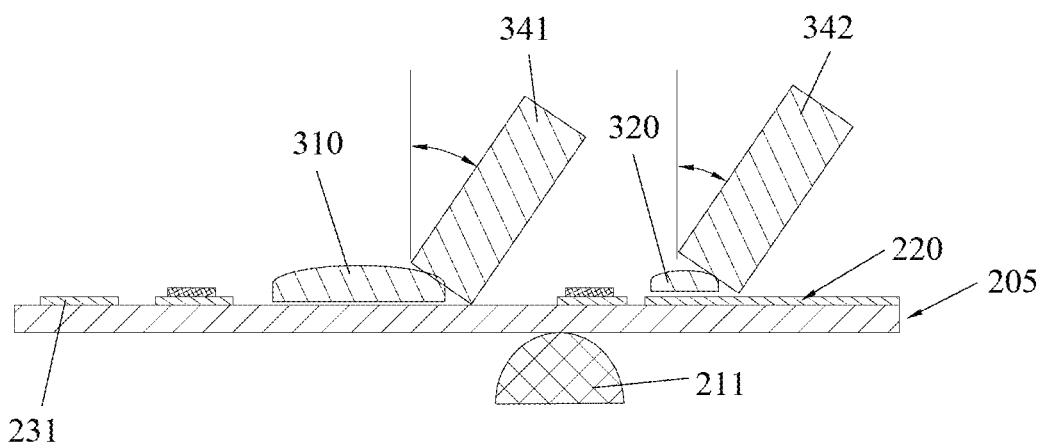
FIG. 7 is a schematic view showing the dispensing process of the adhesives.

As an embodiment, the first adhesive 310 and the second adhesive 320 are dispensed by an individual dispenser 341/342 whose dispensing tip is located at around 25 degrees relative to the flexure surface, as shown in FIG. 7. After dispensing the adhesives 310, 320, the trailing edge 203c of the slider 203 is welded to the bonding pads 231 on the suspension surface, and then the adhesives 310, 320 are cured, in such a way, the slider 203 is bonded to the suspension (referring to FIGS. 5 and 6). Preferably, the first and the second adhesives 310, 320 can be cured by hot $N_2$ gas or laser radiation.

In a preferable embodiment, a first surface 236a of the gimbal tongue 236 is parallel to the opposite surface 203b of the ABS 203a of the slider 203. As shown in FIG. 5, the surface 236a of the gimbal connection area (gimbal tongue of the suspension) is substantially parallel to the horizontal plane, accordingly, the opposite surface 203b of the ABS 203a of the slide 203 is also parallel to the horizontal plane. As another embodiment in the case that the suspension is tilted partly, as illustrated in FIG. 6, the slider 203 is attached on the surface 236a and titled at the same angle such that the surface 236a is parallel to the opposite surface 203b of the air bearing surface 203a of the slider 203. Therefore, collisions or frictions between the tail part of the suspension surface and the opposite surface of the ABS 203a near the leading edge 203d may be prevented during the writing/reading operations of the slider 203.

Figure 9:
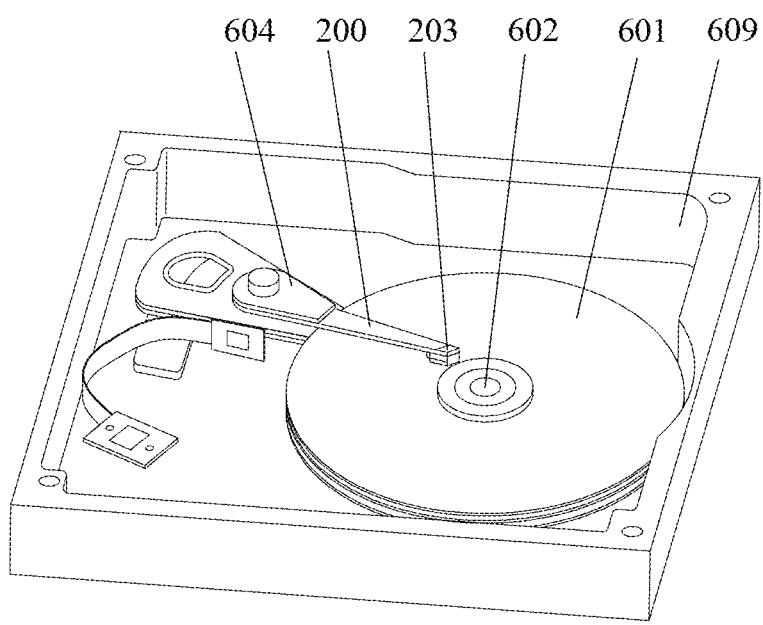
FIG. 9 is a perspective view of a disk drive unit according to an embodiment of the invention.

FIG. 9 is a disk drive unit according to an embodiment of the invention. The disk drive unit 600 includes an HGA 200, a drive arm 604 connected to the HGA 200, a series of rotatable disks 601, and a spindle motor 602 to spin the disk 601, all of which are mounted in a housing 609. Because the structure and/or assembly process of the disk drive unit of the present invention are well known to persons ordinarily skilled in the art, a detailed description of the structure and assembly is omitted herefrom.

Figure 10:
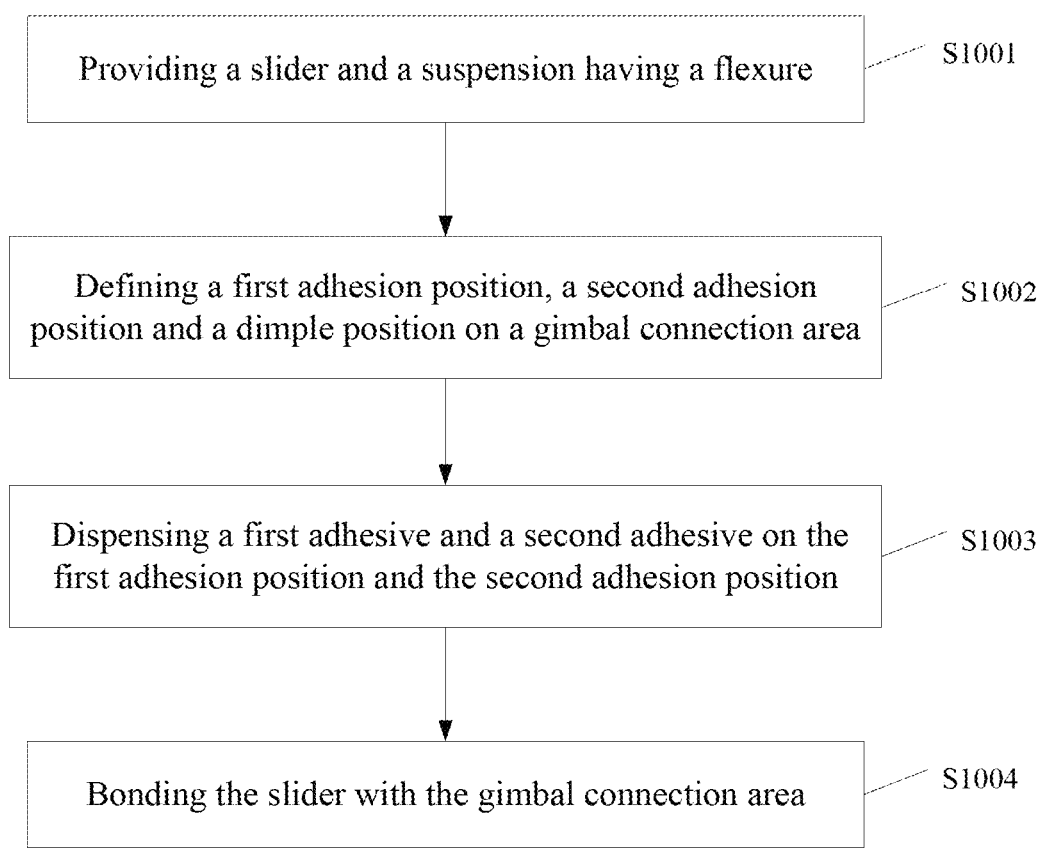
FIG. 10 is a flowchart of a manufacturing method of an HGA according to an embodiment of the present invention.

FIG. 10 is a flowchart of a manufacturing method of an HGA according to an embodiment of the present invention. The method includes the following steps:

S1001, providing a slider and a suspension having a flexure;

S1002, defining a first adhesion position, a second adhesion position and a dimple position on a gimbal connection area on the flexure for supporting and connecting the slider;

S1003, dispensing a first adhesive and a second adhesive on the first adhesion position and the second adhesion position, respectively, wherein a dimple on the dimple position is located between the first adhesive and the second adhesive; and S1004, bonding the slider with the gimbal connection area.

In an embodiment of the present invention, step of bonding the slider with the gimbal connection area may include:

attaching the slider on the gimbal connection area;

curing the first adhesive and the second adhesive on the gimbal connection area; and connecting a trailing edge of the slider with the flexure by soldering.

In an alternative embodiment of the present invention, step of bonding the slider with the gimbal connection area may include:

attaching the slider on the gimbal connection area;

connecting a trailing edge of the slider with the flexure by soldering; and curing the first adhesive and the second adhesive on the gimbal connection area.

Specifically, the first and the second adhesives can be cured by hot $N_2$ gas or laser radiation, the cured adhesives can enable enough adhesion force to prevent the magnetic head from dropping when experienced mechanical shocks; and a certain constraint is created near the leading edge of the slier due to the second adhesive, which reduces the sway gain generated by the slider during the frequency response function testing at a certain modulation frequency such as at 26 kHz, for example, the sway gain can be controlled smaller than ±5 dB, thereby improving the performance of the slider. Furthermore, in such an arrangement of the first and the second adhesive, significant PZT stroke sensitivity loss will not created, for example, stroke sensitivity change from high bias voltage to low bias voltage drop smaller than 25-30%.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly, comprising a slider and a suspension for supporting the slider, wherein the suspension comprises a flexure having a plurality of electrical traces formed thereon and a gimbal connection area supported and connected to the slider, a first surface of the gimbal connection area is provided with a first adhesive and a second adhesive respectively formed thereon and between the first surface of the gimbal connection area and an opposite surface of an air bearing surface of the slider, an opposite surface of the first surface of the gimbal connection area is contacted with a dimple, and the dimple is located at a position between first adhesive and the second adhesive, wherein the first adhesive is formed on a stainless steel surface of the gimbal connection area; a portion of the electrical traces is extended on the first surface of the gimbal connection area, and the second adhesive is formed on a cover layer of the electrical traces.

2. The head gimbal assembly according to claim 1, wherein the position at which the dimple is located corresponds to a center of the slider, the first adhesive is located between the dimple and a trailing edge of the slider, and the second adhesive is located between the dimple and a leading edge of the slider.

3. The head gimbal assembly according to claim 1, wherein the first adhesive, the dimple and the second adhesive are aligned on a centerline of the gimbal connection area.

4. The head gimbal assembly according to claim 1, wherein a size of the first adhesive is 1.5-3 times that of the second adhesive.

5. The head gimbal assembly according to claim 1, wherein the first adhesive has a diameter of 200-300 um, and a thickness of 20-30 um; and the second adhesive has a diameter of 100-200 um, and a thickness of 3-8 um.

6. The head gimbal assembly according to claim 1, wherein the first adhesive and the second adhesive are anaerobic adhesive, and have viscosity of 30-70 kPa*s.

7. The head gimbal assembly according to claim 1, wherein the suspension further comprises piezoelectric elements arranged on both sides of the slider in a width direction and connected to the plurality of electrical traces.

8. The head gimbal assembly according to claim 7, wherein the second adhesive is located at a rotation center of the slider rotated under action of the piezoelectric elements.

9. The head gimbal assembly according to claim 1, wherein the slider is a Pemto, Femto, MAMR or HAMR slider.

10. The head gimbal assembly according to claim 1, wherein the first surface of the gimbal connection area is parallel to the opposite surface of the air bearing surface of the slider.

11. The head gimbal assembly according to claim 10, wherein the opposite surface of the air bearing surface of the slider is inclined relative to a horizontal plane.

12. A disk drive unit, comprising:
a head gimbal assembly;
a drive arm connected to the head gimbal assembly;
a disk; and
a spindle motor operable to spin the disk,
wherein the head gimbal assembly comprises a slider and a suspension for supporting the slider, the suspension comprises a flexure having a plurality of electrical traces formed thereon and a gimbal connection area supported and connected to the slider, a first surface of the gimbal connection area is provided with a first adhesive and a second adhesive respectively formed thereon and between the first surface of the gimbal connection area and an opposite surface of an air bearing surface of the slider, an opposite surface of the first surface of the gimbal connection area is contacted with a dimple, and the dimple is located at a position between first adhesive and the second adhesive,
wherein the first adhesive is formed on a stainless steel surface of the gimbal connection area, a portion of the plurality of electrical traces is extended on the first surface of the gimbal connection area, and the second adhesive is formed on a cover layer of the plurality of electrical traces.

13. A manufacturing method of a head gimbal assembly, comprising:
providing a slider and a suspension having a flexure;
defining a first adhesion position, a second adhesion position and a dimple position on a gimbal connection area on the flexure for supporting and connecting the slider;
dispensing a first adhesive and a second adhesive on the first adhesion position and the second adhesion position, respectively, wherein a dimple on the dimple position is located between the first adhesive and the second adhesive; and
bonding the slider with the gimbal connection area,
wherein the method further comprises arranging piezoelectric elements arranged on both sides of the slider in a width direction, wherein the second adhesive is located at a rotation center of the slider rotated under action of the piezoelectric elements.

14. The manufacturing method according to claim 13, wherein said bonding the slider with the gimbal connection area comprises:
attaching the slider on the gimbal connection area;
curing the first adhesive and the second adhesive on the gimbal connection area; and
connecting a trailing edge of the slider with the flexure by soldering.

15. The manufacturing method according to claim 13, wherein said bonding the slider with the gimbal connection area comprises:
attaching the slider on the gimbal connection area;
connecting a trailing edge of the slider with the flexure by soldering; and
curing the first adhesive and the second adhesive on the gimbal connection area.

16. The manufacturing method according to claim 13, further comprising performing said dispensing by using two individual dispenser units.

17. The manufacturing method according to claim 13, wherein the dimple is located at a position corresponding to a center of the slider, the first adhesive is located between the dimple and a trailing edge of the slider, and the second adhesive is located between the dimple and a leading edge of the slider.

18. The manufacturing method according to claim 13, wherein the first adhesive, the dimple and the second adhesive are aligned on a centerline of the gimbal connection area.

19. A head gimbal assembly, comprising a slider and a suspension for supporting the slider, wherein the suspension comprises a flexure having a plurality of electrical traces formed thereon and a gimbal connection area supported and connected to the slider, a first surface of the gimbal connection area is provided with a first adhesive and a second adhesive respectively formed thereon and between the first surface of the gimbal connection area and an opposite surface of an air bearing surface of the slider, an opposite surface of the first surface of the gimbal connection area is contacted with a dimple, and the dimple is located at a position between first adhesive and the second adhesive,
wherein the suspension further comprises piezoelectric elements arranged on both sides of the slider in a width direction and connected to the plurality of electrical traces, and the second adhesive is located at a rotation center of the slider rotated under action of the piezoelectric elements.

* * * * *